(12) United States Patent
Ikenoya

(10) Patent No.: US 7,756,944 B2
(45) Date of Patent: Jul. 13, 2010

(54) INFORMATION PROVIDING APPARATUS, INFORMATION PROVIDING METHOD, INFORMATION PROVIDING PROGRAM, AND RECORDING MEDIUM

(75) Inventor: Kazuyuki Ikenoya, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 1059 days.

(21) Appl. No.: 11/046,851

(22) Filed: Feb. 1, 2005

(65) Prior Publication Data

US 2005/0222991 A1 Oct. 6, 2005

(30) Foreign Application Priority Data

Feb. 4, 2004 (JP) ............................. 2004-027903
Jan. 25, 2005 (JP) ............................. 2005-016833

(51) Int. Cl.
G06F 15/16 (2006.01)
(52) U.S. Cl. ................... 709/217; 709/225; 709/227; 707/3; 726/3; 395/793
(58) Field of Classification Search .............. 707/3; 395/739; 709/217, 225, 227, 25; 726/3
See application file for complete search history.

(56) References Cited

U.S. PATENT DOCUMENTS

| | | | |
|---|---|---|---|
| 5,455,953 A | | 10/1995 | Russell |
| 5,455,993 A | * | 10/1995 | Link et al. ...................... 29/40 |
| 7,016,877 B1 | * | 3/2006 | Steele et al. ................... 705/50 |
| 7,039,714 B1 | * | 5/2006 | Blakley, III et al. ........ 709/229 |
| 7,085,834 B2 | * | 8/2006 | Delany et al. ................ 709/225 |
| 7,392,536 B2 | * | 6/2008 | Jamieson et al. ............... 726/8 |
| 2002/0112155 A1 | | 8/2002 | Martherus et al. |
| 2002/0168962 A1 | * | 11/2002 | Kurakake et al. ........... 455/411 |
| 2003/0126137 A1 | * | 7/2003 | McFadden ................... 707/100 |

(Continued)

FOREIGN PATENT DOCUMENTS

JP 2002-73419 3/2002

OTHER PUBLICATIONS

Yuichi Nakamur, et al., "Towards the integration of Web Services Security on Enterprise Environments", IEEE, XP-10587876, 2002, pp. 166-175.

(Continued)

*Primary Examiner*—John Follansbee
*Assistant Examiner*—Anthony Mejia
(74) *Attorney, Agent, or Firm*—Oblon, Spivak, McClelland, Maier & Neustadt, L.L.P.

(57) ABSTRACT

An information providing apparatus is disclosed that integrally provides information that may be shared by plural applications and information that is dedicated to a particular application. The information providing apparatus includes a merge unit that merges a first information providing unit and a second information providing unit. The merge unit includes an information acquisition unit that acquires information pertaining to a user in response to a request from a predetermined application of plural applications, the information acquisition unit acquiring information shared by the applications from the first information providing unit and information dedicated to the predetermined application from the second information providing unit. The merge unit also includes an information integrating unit that integrates the information acquired from the first information providing unit and the information acquired from the second information providing unit. The merge unit then provides the information integrated by the information integrating unit to the predetermined application.

12 Claims, 13 Drawing Sheets

U.S. PATENT DOCUMENTS

| | | |
|---|---|---|
| 2003/0163694 A1 | 8/2003 | Chen et al. |
| 2003/0163733 A1 | 8/2003 | Barriga-Caceres et al. |
| 2004/0139319 A1* | 7/2004 | Favazza et al. ............... 713/168 |
| 2004/0260709 A1* | 12/2004 | Matsuno et al. ............. 707/100 |
| 2005/0114701 A1* | 5/2005 | Atkins et al. ................ 713/201 |
| 2005/0120214 A1* | 6/2005 | Yeates et al. ................ 713/171 |

OTHER PUBLICATIONS

Cristina Buchholz, "Web Services—Control Meets Collaboration", IEEE, XP-10645623, 2003, pp. 89-96.

* cited by examiner

FIG.7

| PROVIDER NAME | CLASS |
|---|---|
| W PROVIDER | Primary |
| ROLE PROVIDER | Additional |

| | | PROVIDER NAME | W PROVIDER |
|---|---|---|---|
| 511 | USER INFORMATION | DOMAIN | SSC |
| | | NAME | Taro |
| | | UNIQUE ID | 123-435-sss |
| 512 | GROUP INFORMATION 1 | PROVIDER NAME | W PROVIDER |
| | | DOMAIN | SSC |
| | | NAME | Group1 |
| | | UNIQUE ID | 123-32223-4444 |
| 513 | GROUP INFORMATION 2 | PROVIDER NAME | W PROVIDER |
| | | DOMAIN | SSC |
| | | NAME | Group 2 |
| | | UNIQUE ID | 123-456-3wsr34d |

| UNIQUE ID | USER NAME | ROLE ID |
|---|---|---|
| 123-435-sss | Taro | 999-111-111 |
| 123-435-sss | Taro | 999-111-112 |
| 123-123-1213 | Hanako | 999-111-111 |
| : | : | ; |

| ROLE ID | ROLE NAME |
|---|---|
| 999-111-111 | RSAdmin |
| 999-111-112 | CSAdmin |
| : | : |

FIG.11

| USER INFORMATION | PROVIDER NAME | W PROVIDER |
| --- | --- | --- |
| | DOMAIN | |
| | NAME | Taro |
| | UNIQUE ID | 123-435-sss |
| GROUP INFORMATION 1 | PROVIDER NAME | ADMINISTRATOR ROLE PROVIDER |
| | DOMAIN | |
| | NAME | RSAdmin |
| | UNIQUE ID | 999-111-111 |
| GROUP INFORMATION 2 | PROVIDER NAME | ADMINISTRATOR ROLE PROVIDER |
| | DOMAIN | |
| | NAME | CSAdmin |
| | UNIQUE ID | 999-111-112 |

| USER INFORMATION | PROVIDER NAME | W PROVIDER |
| --- | --- | --- |
| | DOMAIN | SSC |
| | NAME | Taro |
| | UNIQUE ID | 123-435-sss |
| GROUP INFORMATION 1 | PROVIDER NAME | W PROVIDER |
| | DOMAIN | SSC |
| | NAME | Group1 |
| | UNIQUE ID | 123-32223-4444 |
| GROUP INFORMATION 2 | PROVIDER NAME | W PROVIDER |
| | DOMAIN | SSC |
| | NAME | Group2 |
| | UNIQUE ID | 123-456-3wsr34d |
| GROUP INFORMATION 3 | PROVIDER NAME | ADMINISTRATOR ROLE PROVIDER |
| | DOMAIN | |
| | NAME | RSAdmin |
| | UNIQUE ID | 999-111-111 |
| GROUP INFORMATION 4 | PROVIDER NAME | ADMINISTRATOR ROLE PROVIDER |
| | DOMAIN | |
| | NAME | CSAdmin |
| | UNIQUE ID | 999-111-112 |

FIG.15

| PROVIDER NAME | CLASS | GROUP INFORMATION | E-MAIL ADDRESS | ... |
|---|---|---|---|---|
| W PROVIDER | Primary | ○ | × | ... |
| ROLE PROVIDER | Additional | ○ | ○ | ... | ately realized if user authority information within the user management system and user authority information dedicated to a particular application may be integrally provided to the application.

INFORMATION PROVIDING APPARATUS, INFORMATION PROVIDING METHOD, INFORMATION PROVIDING PROGRAM, AND RECORDING MEDIUM

BACKGROUND OF THE INVENTION

1. Field of the Invention

The present invention relates an information providing apparatus, an information providing method, an information providing program, and a recording medium for providing information pertaining to a user.

2. Description of the Related Art

Generally, in an information system including plural computers, a server is provided for collectively managing plural sets of information pertaining to respective users of the system (referred to as 'user attribute information' hereinafter), and conducting user authentication of a user (such server being referred to as 'user management server' hereinafter). A domain controller provided in a Windows (registered trademark) environment is one representative example of such a system.

An application implemented in such an information system may access the user management server to authenticate the user of the application and/or acquire user attribute information of the user in an efficient manner. In the prior art, the user attribute information managed in the user management server corresponds to general information that may be commonly used among plural applications implemented in the system, and thereby, user attribute information dedicated to each individual application has to be managed separately by the corresponding application.

However, when user attribute information dedicated to a particular application is managed separately from the user management system, the application has to take into account the fact that the user attribute information is managed in plural areas. As a result, the implementation of the application may be complicated.

To counter such a problem, the user attribute information dedicated to an application may be assigned to an unused area of the user management system, or a database scheme of the user management system may be extended so that the user attribute information dedicated to an application may be assigned to the extended area. However, in the former case, the scalability of the user management system may be lost, and in the latter case, the number of items being managed by the user management service may be increased. Also, providing user attribute information dedicated to a particular application within the user management system intended for common use among plural applications may result in loss of versatility of the user management system.

Accordingly, a technique is desired for integrally providing to an application user attribute information provided within the user management system and user attribute information dedicated to the particular application without having to add changes to the user management system.

Also, in some cases, it may be desired that the authority of a user with respect to a particular application be defined according to a classification scheme that is different from group information that is managed by the user management system. By defining the authority of a user with respect to a particular application according to a classification scheme that is different from the group information managed by the user management system, for example, a user that is recognized as a general user within the user management system may be recognized as an administrator user within a particular application. In such case, a convenient system may be

SUMMARY OF THE INVENTION

Accordingly, it is an object of the present invention to provide an information providing apparatus, an information providing method, an information providing program and a recording medium for integrally providing information that may be shared by plural applications and information that is dedicated to a particular application.

According to an aspect of the present invention, an information providing apparatus is provided that includes a merge unit configured to merge a first information providing unit and a second information providing unit. The merge unit includes an information acquisition unit that acquires information pertaining to a user in response to a request from a predetermined application of plural applications, the information acquisition unit acquiring information shared by the applications from the first information providing unit and information dedicated to the predetermined application from the second information providing unit. The merge unit further includes an information integrating unit that integrates the information acquired from the first information providing unit and the information acquired from the second information providing unit. The merge unit also provides the information integrated by the information integrating unit to the predetermined application.

According to other aspects of the present invention, an information proving method conducted in an information providing apparatus of the present invention, an information providing program executing such an information providing method in an information proving apparatus of the present invention, and a recording medium storing such an information providing program are provided.

BRIEF DESCRIPTION OF THE DRAWINGS

FIG. 7 is a table showing an exemplary configuration of merge structure information;

FIG. 8 is a table illustrating an exemplary configuration of a ticket generated by a W provider;

FIG. 9 illustrates an exemplary configuration of a user-role correspondence table that is included in a role DB;

FIG. 10 illustrates an exemplary configuration of a role management table included in the role DB;

FIG. 11 is a table illustrating an exemplary configuration of a pseudo ticket generated by a role provider;

FIG. 12 is a table illustrating an exemplary configuration of a merged ticket;

FIG. 15 is a table illustrating an exemplary configuration of merge structure information including a merge method.

DESCRIPTION OF THE PREFERRED EMBODIMENTS

In the following, preferred embodiments of the present invention are described with reference to the accompanying drawings.

Figure 1:
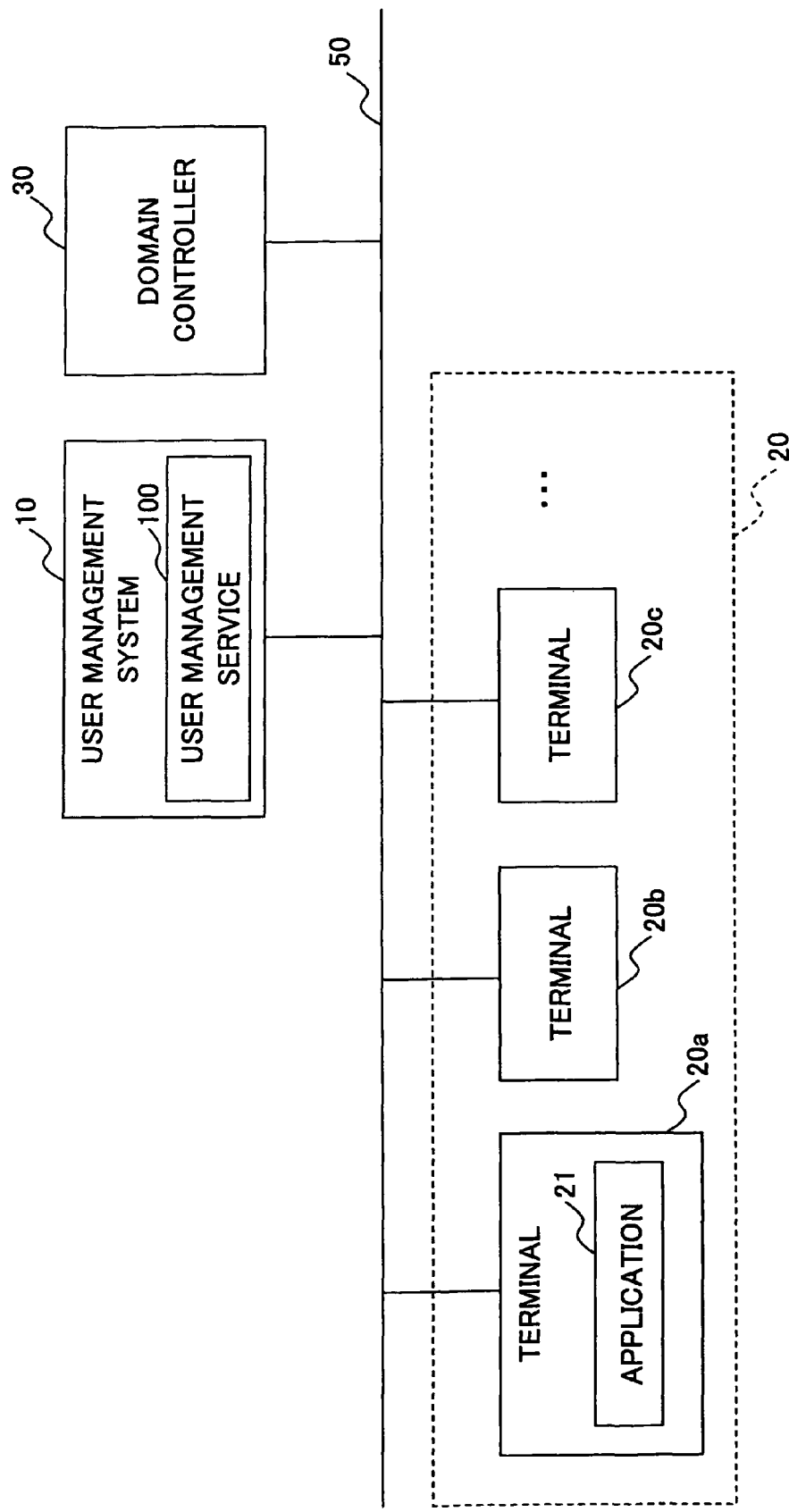
FIG. 1 is a block diagram showing a configuration of a user management system according to an embodiment of the present invention.

FIG. 1 is a block diagram showing a configuration of a user management system according to an embodiment of the present invention. As is shown in FIG. 1, the user management system 1 according to the present embodiment includes a user management server 10, plural terminals such as terminals 20a, 20b, and 20c (collectively referred as 'terminal 20' hereinafter), and a domain controller 20 that are connected by a network 50 such as a LAN (Local Area Network).

The user management server 10 may correspond to a computer that conducts user authentication and implements a user management service 100 corresponding to a Web service for providing information pertaining to a user (referred to as 'user attribute information' hereinafter) to the terminal 20. The user management service 100 may provide user attribute information managed by the domain controller 30 and/or user attribute information managed by the user management service 100 to the terminal 20.

The terminal 20 may correspond to a computer such as a personal computer (PC) that is directly operated by a user, and may implement an application 21. The application 21 may correspond to an application such as a document management application for determining the functions and/or services that may be provided to the user based on the user attribute information provided by the user management server 10.

The domain controller 30 may correspond to a server that collectively manages information pertaining to a domain within a Windows (registered trademark) network environment, for example. According to the present embodiment, the domain controller 30 functions as a server for conducting user authentication for the user of the terminal 20 and providing user attribute information within a Windows (registered trademark) system.

In the following, the user management server 10 is described in detail.

Figure 2:
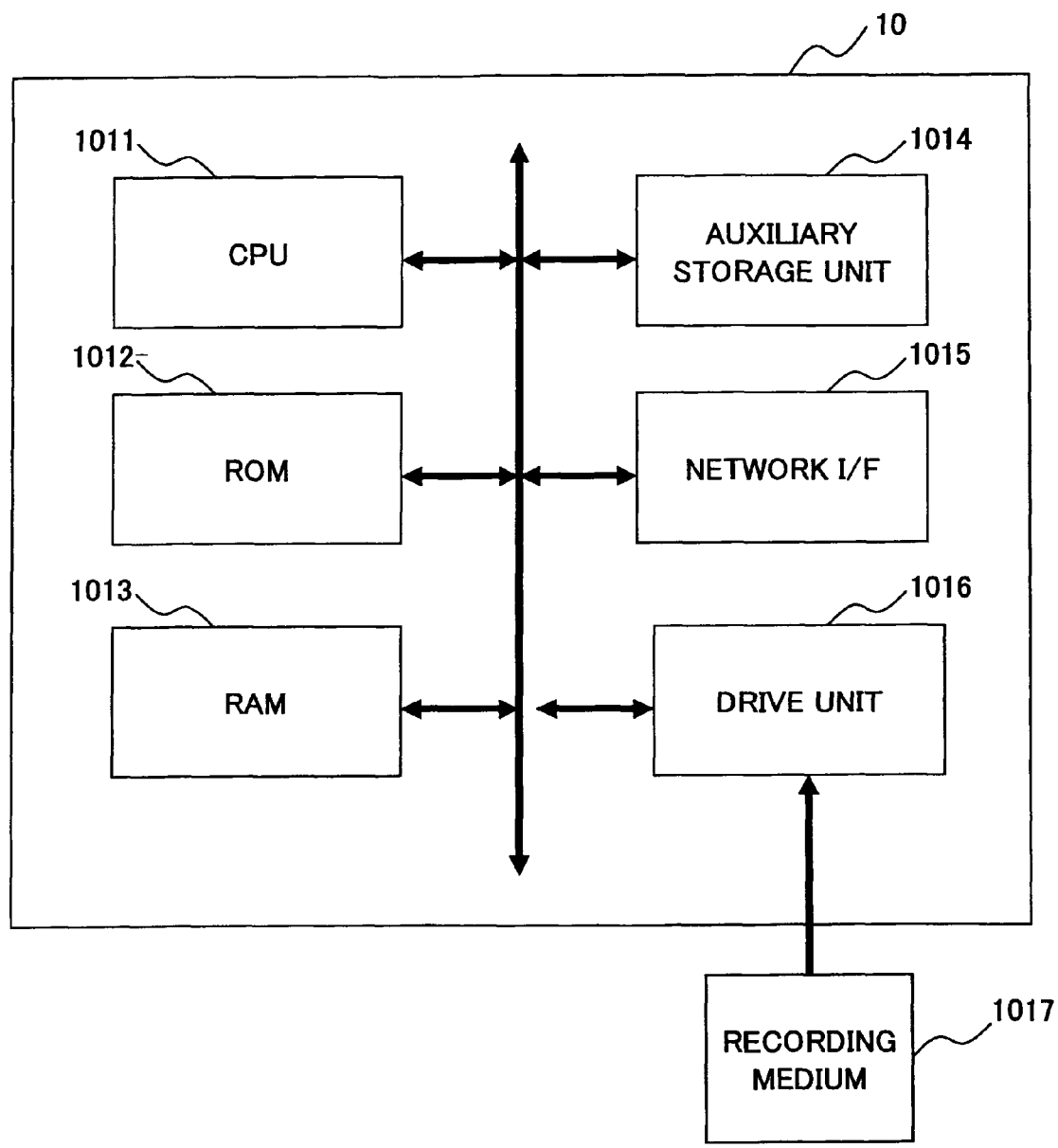
FIG. 2 is a block diagram showing a hardware configuration of a user management server according to an embodiment of the present invention.

FIG. 2 is a block diagram showing a hardware configuration of a user management server according to an embodiment of the present invention. As is shown in FIG. 2, the user management server 10 may include a CPU 1011, a ROM 1012, a RAM 1013, an auxiliary (secondary) storage unit 1014, a network interface (I/F) 1015, and a drive unit 1016, for example.

The CPU 1011 may correspond to a control unit for controlling overall operations of the user management server 10. For example, the CPU 1011 may be configured to execute various control programs and/or application programs that are stored in the ROM 1012 or the auxiliary storage unit 1014 to conduct operations such as apparatus control, communication control, data acquisition, and data editing, for example. The ROM 1012 may correspond to a storage unit that primarily stores control programs for controlling the server apparatus. The RAM 1013 may be used as a working memory or a temporary storage area for the CPU 1011. The auxiliary storage unit 1014 may correspond to a storage unit for storing various application programs and/or data. The network I/F 1015 may correspond to an interface for connecting the user management server 10 to the network 50. The drive unit 1016 may correspond to a device for reading one or more programs for executing a function of the present embodiment from a recording medium 1017 such as a CD-ROM.

It is noted that in FIG. 2, an operations unit and a display unit are not shown. However, according to an embodiment, an operations unit including a keyboard and a mouse, for example, and a display unit realized by a liquid crystal display (LCD) or a cathode ray tube (CRT), for example, may be provided to receive inputs from the user and display operational results.

Figure 3:
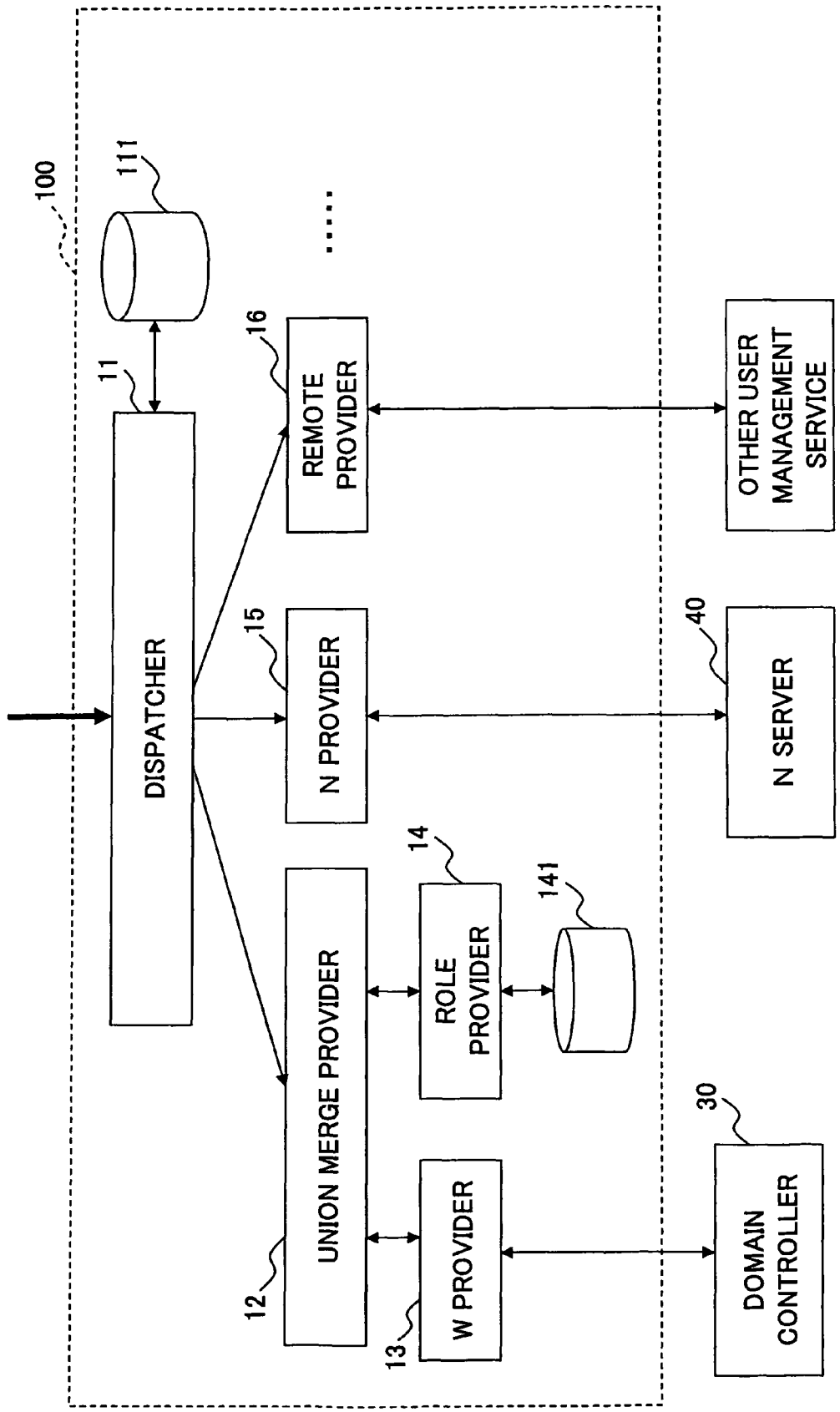
FIG. 3 is a block diagram showing an exemplary configuration of a user management service according to an embodiment of the present invention.

FIG. 3 is a block diagram showing an exemplary configuration of a user management service according to an embodiment of the present invention. As is shown in FIG. 3, the user management service 100 may include a dispatcher 11, a ticket management table 111, a union merge provider 12, a W provider 13, a role provider 14, an N provider 15, a remote provider 16, and a role database (DB) 141, for example.

The union merge provider 12, the W provider 13, the role provider 14, the N provider 15, and the remote provider 16 may correspond to modules that are referred to as 'authentication providers'. Authentication providers correspond to modules that are arranged to assimilate the unique protocols of their corresponding authentication engines, and provide authentication functions of the respective authentication engines through a common interface. By providing a common interface for the authentication providers, a superordinate module (e.g., dispatcher 11) may not have to consider the differing protocols of the authentication engines. Accordingly, a new authentication provider may be added without affecting the implementation of the superordinate module.

For example, an authentication method (authenticateByPassword) may be used as a common interface (method) implemented in each of the authentication providers. The authentication method may use a user name, a password, and a domain name as input arguments, generate data verifying that a user has been authenticated (referred to as 'ticket' hereinafter) in response to a successful authentication of the user, and return the generated ticket. It is noted that information such as group information pertaining to a group to which a corresponding user belongs may be recorded on the ticket at a management system of a corresponding authentication engine.

According to a specific example, the W provider 13 may correspond to an authentication provider associated with password authentication within the Windows (registered trademark) domain controller 30. When the authentication method is called, the W provider 13 may request the domain controller 30 to authenticate a user, acquire information such as group information associated with the user from the domain controller 30, and return a ticket with the acquired information recorded thereon.

The N provider may correspond to an authentication provider associated with password authentication within a Notes (registered trademark) server (indicated as 'N server 40' in FIG. 3), for example.

The remote provider 16 may correspond to an authentication provider that is not directly associated with an authentication engine, but is instead associated with another service having features similar to those of the user management service 100 (indicated as 'other user management service' in FIG. 3). When the authentication method is called, the remote provider 16 may call the authentication method of the other user management service, receive a ticket generated by the other user management service as a response to the call, and return the received ticket.

The role provider 14 may correspond to an authentication provider that is not primarily directed to authentication but is rather directed to providing unique user attribute information that is dedicated to the application 21, the unique user attribute information being managed in the role DB 141. The unique user attribute information for the application 21 may correspond to information individually defined by the application 21. The application 21 may use its unique user attribute information to identify the authority of each user, for example. When the authentication method is called, the role provider 14 may search the role DB 141 to acquire unique user attribute information dedicated to the application 21 that is associated with the user subject to authentication, store the searched out information in a ticket, and return this ticket.

Figure 4:
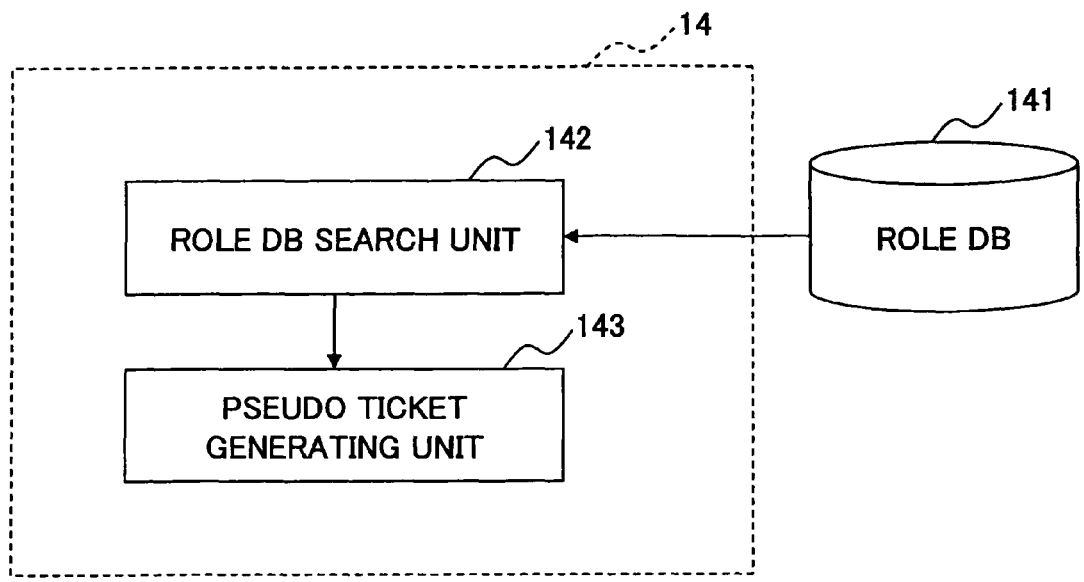
FIG. 4 is a block diagram showing a functional configuration of a role provider according to an embodiment of the present invention.

FIG. 4 is a block diagram showing a functional configuration of a role provider according to an embodiment of the present invention. As is shown in FIG. 4, the role provider 14 may include a role DB search unit 142 and a pseudo ticket generating unit 143, for example. The role DB search unit 142 may be arranged to search for unique user attribute information dedicated to the application 21. The pseudo ticket generating unit 143 may be arranged to generate a pseudo ticket based on information searched out by the role DB search unit 142. It is noted that the expression 'pseudo' is used in the sense that the ticket is basically generated for verifying that user authentication has been successful conducted, but in the role provider 14 user authentication is not actually conducted. Thereby, the ticket returned by the role provider 14 may not signify that the user has been authenticated, and instead the ticket may function as a medium that stores unique user attribute information for the application 21.

Referring back to FIG. 3, the union merge provider 12 may correspond to one form of an authentication provider that does not function as a direct arbitrator for an authentication engine, but is rather configured to collectively control at least two authentication providers as though the authentication providers correspond to a single authentication provider corresponding to a superordinate module. According to the illustrated example, the union merge provider 12 merges the W provider 13 and the role provider 14 together. When the authentication method is called, the merge provider 12 may call authentication methods of the W provider 13 and the role provider 14, and return a merger of the tickets returned by the respective modules (referred to as 'merged ticket' hereinafter).

Figure 5:
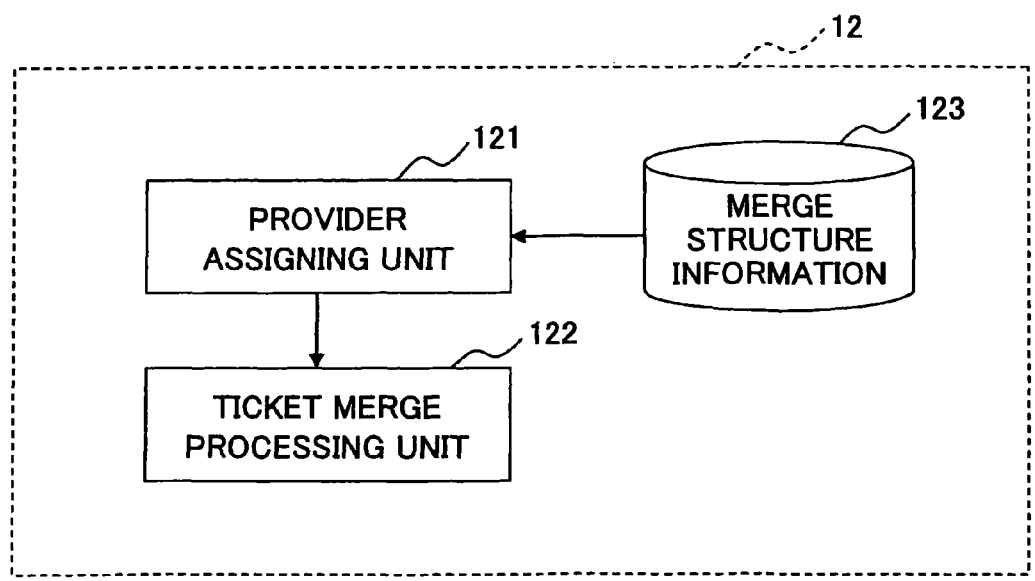
FIG. 5 is a block diagram showing an exemplary functional configuration of a union merge provider.

FIG. 5 is a block diagram showing an exemplary functional configuration of the union merge provider. As is shown in FIG. 5, the union merge provider 12 may include a provider assigning unit 121, a ticket merge processing unit 122, and merge structure information 123, for example. The provider assigning unit 121 may be arranged to call the respective authentication providers that are merged by the union merge provider 12 to acquire tickets therefrom. The ticket merge processing unit 122 may merge the acquired tickets together to generate a merged ticket. The merge structure information 123 may correspond to information for identifying the authentication providers that are merged by the union merge provider 12 and determining the order in which the provider assigning unit 121 is to call the respective authentication providers.

Referring back to FIG. 3, the dispatcher 11 may correspond to a module for calling the one or more authentication providers described above according to a user authentication request from the application 21. The dispatcher 11 may also transmit the tickets returned from the called authentication provider as a response to the authentication request made by the application 21. The ticket management table 111 may correspond to a table for storing tickets returned from the authentication providers.

In the following, process steps of an operation of the user management server 10 of FIG. 3 are described.

Figure 6:
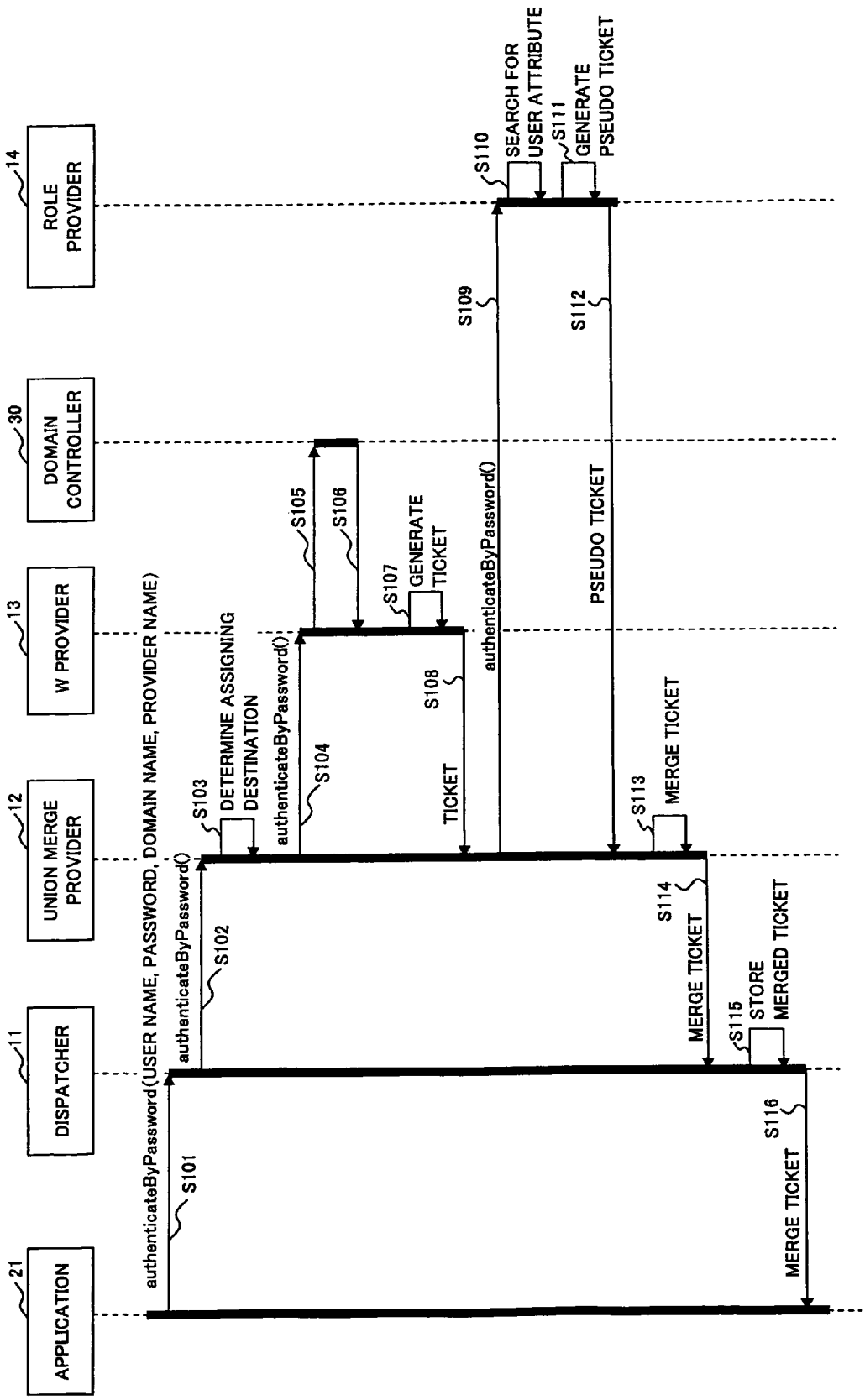
FIG. 6 is a sequence chart illustrating process steps executed by the user management server in response to a user authentication request.

FIG. 6 is a sequence chart illustrating process steps executed by the user management server in response to a user authentication request.

According to this drawing, in step S101, upon receiving inputs such as a user name, a password, and a domain name from a user, the application 21 may call the authentication method (authenticateByPassword) of the user management service 100 through RPC (Remote Procedure Call) using SOAP (Simple Object Access Protocol) to send a request to authenticate the user of the terminal 20 (SOAP request) to the user management service 100. According to an embodiment, the user name, the password, and the domain name input by the user and the provider name of the authentication provider corresponding to the destination of the authentication request may be designated as arguments of the authentication method. In the present example, it is assumed that the union merge provider 12 is designated as the destination of the authentication request issued by the application 21. Accordingly, the argument designating the provider name may be set to 'union merge provider' corresponding to the provider name of the union merge provider 12.

It is noted that in the illustrated example, RPC using SOAP is implemented; however, the protocol or architecture for RPC is not limited to SOAP, and for example, a suitable protocol or architecture such as DCE (Data Communications Exchange), CORBA (Common Object Request Broker Architecture), or DCOM (Distributed Common Object Model) may be selected according to the system environment.

After step S101, the operation process moves on to step S102 where the dispatcher 11 receiving the SOAP request from the application 21 calls the authentication method of the union merge provider 12 based on the provider name (i.e., union merge provider) that is designated as the authentication method argument. It is noted that the user name, the password, and the domain name are carried on into the arguments of the authentication method of the union merge provider 12. After step S102, the operation process moves on to step S103 where the union merge provider 12 refers to the merge structure information 123 to identify the authentication providers being merged together and determine the order in which the authentication providers are to be called.

FIG. 7 is a table showing an exemplary configuration of the merge structure information 123. According to the present example, the merge structure information 123 indicates the provider name and class (i.e., 'Primary' or 'Additional') of the W provider 13 and the role provider 14 corresponding to the authentication providers that are merged by the union merge provider 12. Accordingly, the union merge provider 12 may be able to identify the authentication providers being merged based on the provider names included in the merge structure information 123, and determine the order in which the merged authentication providers are to be called based on their classes. Specifically, in the present example, two classes referred to as 'Primary' and 'Additional', respectively, are provided, and the authentication provider that is classified as 'Primary' corresponds to the authentication provider that is to be called first. By managing the information pertaining to the merged authentication providers as external information (merge structure information 123) rather than hard coding the information in the source code of the union merge provider 12, the authentication providers being merged by the union merge provider 12 may be changed without having to make corrections, compilations, or links for the source code of the union merge provider 12.

Based on the merge structure information 123, the provider assigning unit 121 of the union merge provider 12 may provide the user name, password, and domain name as arguments to call the authentication method (authenticationByPassword) of the W provider 13 (step S104). Following step S104, the W provider 13, may send an authentication request to the domain controller 30 to conduct user authentication based on the user name, password and domain name provided thereto, and acquire user attribute information of the authenticated user (steps S105 and S106). After step S106, the operation process moves on to step S107 where the W provider 13 generates a ticket based on the information acquired from the domain controller 30.

FIG. 8 is a table illustrating an exemplary configuration of a ticket generated by the W provider. The ticket 510 as is shown in FIG. 8 includes user information 511 pertaining to the authenticated user, and group information 1 (512) and group information 2 (513) each pertaining to a group to which the authenticated user belongs. According to the present example, each set of user information and group information includes information for identifying the provider name of the authentication provider that has acquired the concerned information, the domain to which the concerned user or group belongs, the user name or the group name of the concerned user or group, and the unique ID for identifying the concerned user or group. According to the present example, based on the ticket 510, it may be determined that the user corresponds to a user named 'Taro' who is defined in the SSC domain, and that the user 'Taro' belongs to two groups, 'Group 1' and 'Group 2', that are both defined in the SSC domain. It is noted that a unique ID may correspond to identification information for unambiguously identifying a corresponding user within plural authentication providers. In other words, identical unique IDs in different authentication providers may correspond to identification information for the same user.

After step S107, the operation proceeds to step S108 where the W provider 13 outputs the generated ticket 510 to the union merge provider 12.

After step S108, the operation proceeds to step S109 where the provider assigning unit 121 of the union merge provider 12 designates the user name, password, and domain name as arguments to call the authentication method (authenticationByPassword) of the role provider 14. After step S109, the operation proceeds to step S110 where the role DB search unit 142 of the role provider 14 accesses the role DB 141 to search for user attribute information of the user based on the designated user name.

FIG. 9 illustrates an exemplary configuration of a user-role correspondence table that is included in the role DB 141. The user-role correspondence table 141a as is shown in FIG. 9 corresponds to a table managing the correspondence between user and role, and each entry of this correspondence table is arranged to include a unique ID and a user name as information for identifying the user, and a unique role ID as information for identifying the role. It is noted that a role may correspond to a concept for determining authority of a user with respect to a particular function of the application 21 (i.e., whether a user has authorization to use such function). For example, whether a user has authorization to use a particular function of the application 21 may be determined depending on the role that is assigned to the user. It is noted that the correspondence between user and role may be established on a many-to-many basis, that is, a particular user may be assigned to plural roles, and a particular role may be assigned to plural users.

FIG. 10 illustrates an exemplary configuration of a role management table included in the role DB 141. The role management table 141b as is shown in FIG. 10 corresponds to a table managing the correspondence between role ID and role name for each role defined by the unique role ID.

According to the present example, the role DB search unit 142 may determine from the user-role correspondence table 141a and the role management table 141b that the user 'Taro' is assigned to the roles 'RSAdmin' and 'CSAdmin'.

After step S110, the operation moves to step S111 where the pseudo ticket generating unit 143 of the role provider 14 generates a pseudo ticket based on the information searched out by the role DB search unit 142.

FIG. 11 is a table illustrating an exemplary configuration of a pseudo ticket generated by the role provider 14. It is noted that the pseudo ticket 520 as is shown in FIG. 11 has a structure identical to that of the ticket 510 generated by the W provider 13 (see FIG. 8). That is, since the concept of a 'role' may be quite similar to the concept of a 'group', in the present example, role information is handled as group information so that the ticket 510 generated by the W provider 13 and the ticket 520 generated by the role provider 14 may have identical structures. Based on the pseudo ticket 520, it may be determined that the user 'Taro' is assigned to the role 'RSAdmin' and the role 'CSAdmin'.

After step S111, the operation may proceed to step S112 where the role provider 14 outputs the generated pseudo ticket 520 to the union merge provider 12. It is noted that the pseudo ticket 520 output to the union merge provider 12 from the role provider 14 and the ticket 510 from the W provider 13 pertain to the same user (Taro).

Then, the process step S112 is followed by step S113 where the ticket merge processing unit 122 of the union merge provider 12 merges the ticket 510 from the W provider 13 and the pseudo ticket 520 from the role provider 14 to generate one single merged ticket.

FIG. 12 is a table illustrating an exemplary configuration of a merged ticket. The merged ticket 530 as is shown in FIG. 12 corresponds to a merger of the user information and group information of the ticket 510 and the group information of the pseudo ticket 520. Based on the merged ticket 530, it may be determined that the user 'Taro' is assigned to 'Group 1', 'Group 2', 'RSAdmin', and 'CSAdmin'. However, it is noted that the first two groups (i.e., 'Group 1' and 'Group 2') and the latter two groups (i.e., 'RSAdmin', and 'CSAdmin') are based on fundamentally different concepts. That is, the first two groups correspond to groups defined in the domain controller 30 within the Windows (registered trademark) system (i.e., operating environment of the application 21), whereas the latter two groups correspond to roles for identifying the user authority defined within the application 21.

Then, step S113 is followed by step S114 where the union merge provider 12 outputs the generated merged ticket 530 to the dispatcher 11. Then, in step S115, the dispatcher 11 registers the merged ticket 530 in the ticket management table 111.

Figure 13:
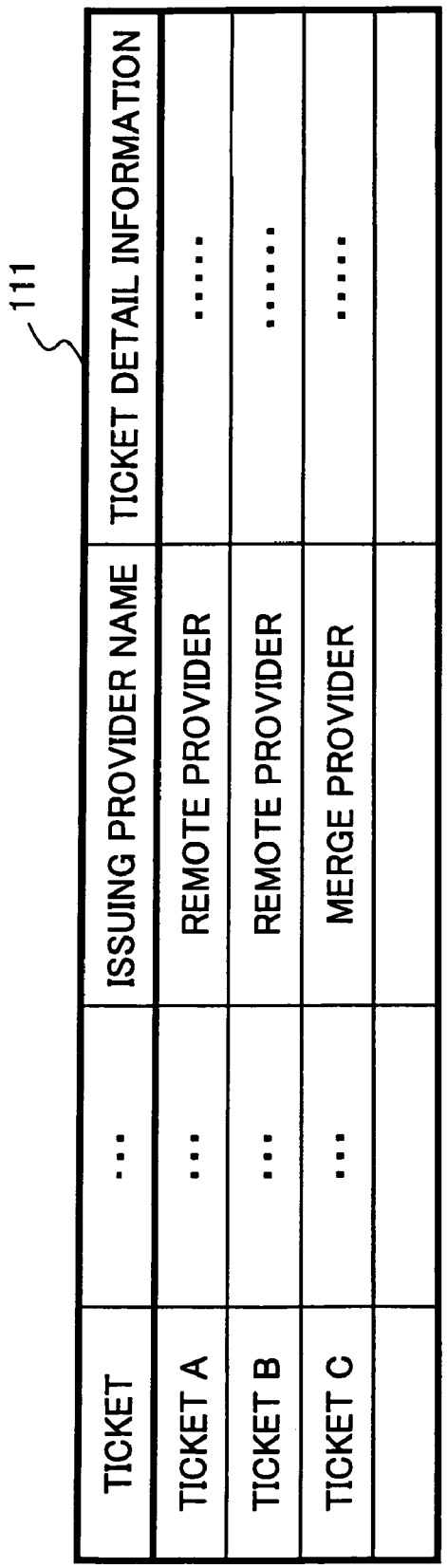
FIG. 13 illustrates an exemplary configuration of a ticket management table.

FIG. 13 illustrates an exemplary configuration of a ticket management table. The ticket management table 111 shown in FIG. 13 corresponds to a table for managing information such as the ticket content, the issuing provider name, and ticket detailed information for each issued ticket. It is noted that the ticket content may correspond to the actual information included in the concerned ticket. The issuing provider name may correspond to the provider name of the authentication provider that has issued the concerned ticket. The ticket detail information may correspond to information pertaining to the user that is associated with the concerned ticket.

It is noted that information registered in the ticket management table 111 may be used as reference information in a case where a service that is presented with a merged ticket from the application 21 issues a confirmation request to confirm the accuracy of the merged ticket, for example.

After step S115, the operation moves on to step S116 in which the dispatcher 11 sends a SOAP message including the merged ticket 530 as a SOAP response to the application 21. In turn, the application 21 receiving the merged ticket 530 may identify the authority of the user based on the role information registered as group information 3 and 4 in the merged ticket 530 to determine the functions that may be provided to the user.

As is described above, according to the present embodiment, the union merge provider 12 of the user management server 10 may merge the information managed by the domain controller 30 with the role information dedicated to the application 21 that is managed in the role DB 141 by a user, and provide the merged information to the application 21. Thereby, user attribute information dedicated to the application 21 may be supplied together with general user attribute information to the application 21 without affecting the domain controller 30.

It is noted that in the embodiments described above, role information is presented as an exemplary form of information dedicated to a specific application; however, the present invention is not limited to such embodiments and other various forms of information may be used as well. It is also noted that in the embodiments described above, the W provider 13, the role provider 14, and the union merge provider 12 are implemented in the same computer (i.e., user management server 10); however, other embodiments are possible in which the W provider 13 and the role provider 14 are implemented in a computer that is different from that implementing the union merge provider 12, for example. In this case, the union merge provider 12 may be connected to the W provider 13 and the role provider 14 by a protocol such as SOAP for realizing RPC so that the authentication providers may function in a similar manner to those in the case where the authentication providers are implemented in a single computer.

It is also noted that in the embodiments described above, the union merge provider 12 is arranged to merge the processes of plural authentication providers or the tickets generated by the authentication providers upon conducting a user authentication process. However, the merger of plural authentication providers by the union merge provider 12 is not limited to application in authentication processes. In the following, an embodiment is described for a case in which a search request for user attribute information of a given user is issued.

Figure 14:
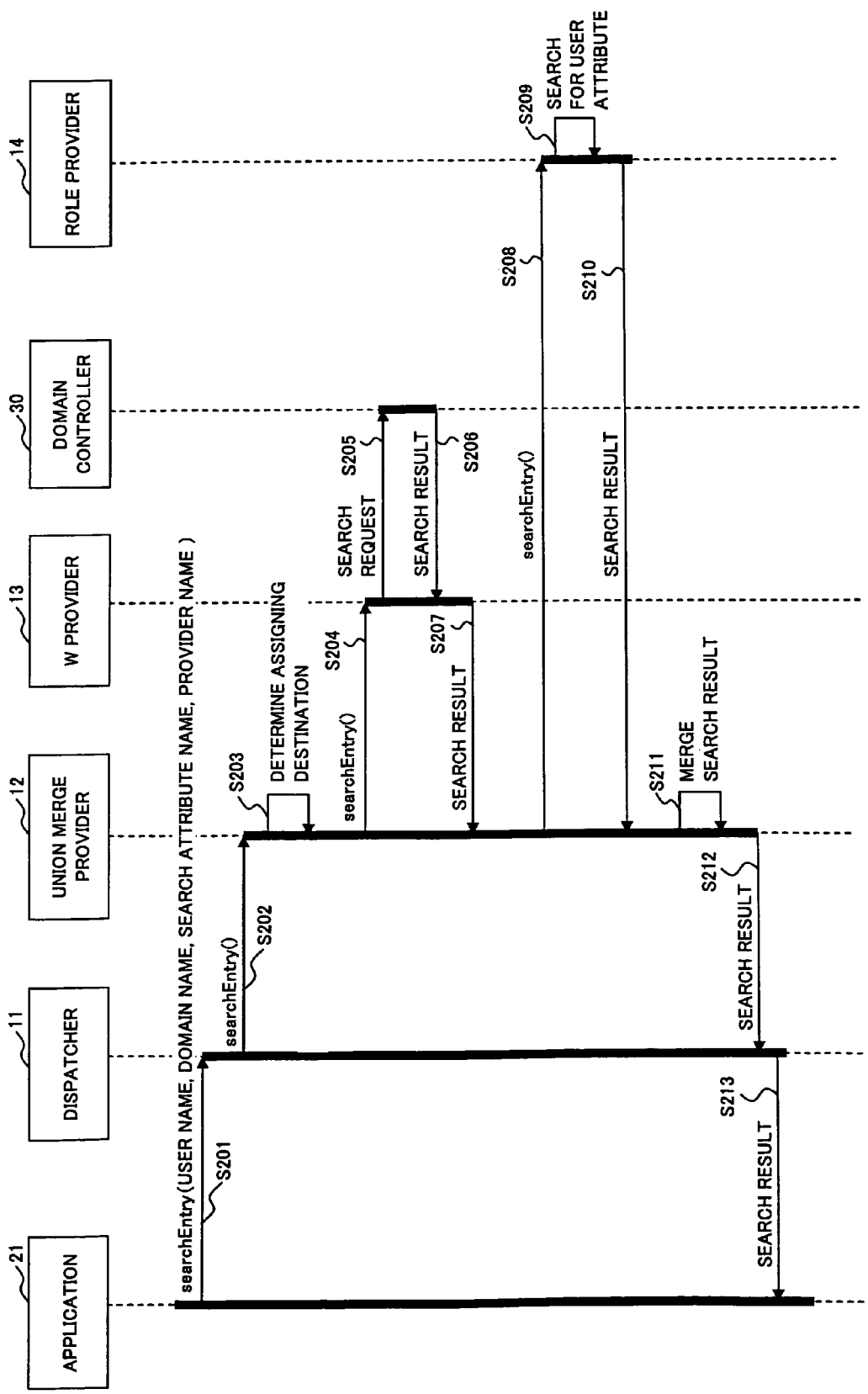
FIG. 14 is a sequence chart illustrating process steps for conducting a user attribute information search process.

FIG. 14 is a sequence chart illustrating process steps for conducting a user attribute information search process. It is noted that the process of FIG. 14 is fundamentally different from the process of FIG. 6. That is, in the process of FIG. 14 user attribute information pertaining to a user other than the current user is searched out and provided as a ticket.

According to the present example, in step S201, the application 21 calls a search method (serachEntry) of the user management service 100 through RPC using SOAP to transmit a search request to search for user attribute information pertaining to a given user (SOAP request) to the user management service 100. A user name and a domain name of the user subject to the search process, information for identifying an attribute (e.g., e-mail address) subject to the search process (referred to as 'search attribute name' hereinafter), and a provider name of the authentication provider corresponding to the destination of the search request (e.g., union merge provider) may be designated as arguments of the search method.

Then, step S201 is followed by step S202 in which the dispatcher 11 receiving the SOAP request calls the search method of the union merge provider 12 based on the provider name (union merge provider) that is designated as the argument of the search method. It is noted that the user name, the domain name, and the search attribute name are carried on into the arguments of the authentication method of the union merge provider 12. Then, step S202 is followed by step S203 in which the union merge provider 12 refers to the merge structure information 123 to determine that the W provider 13 and the role provider 14 correspond to the authentication providers that are to be merged, and that the W provider 13 is to be called first.

Then, step S203 is followed by step S204 in which the provider assigning unit 121 of the union merge provider 12 designates the user name, the domain name, and the search attribute name as arguments to call the search method (searchEntry) of the W provider 13. Then, step S204 is followed by step S205 in which the W provider 13 sends a search request to the domain controller 30 to search for an attribute designated by the search attribute name (e.g., e-mail address) of the user designated by the user name and domain name provided as arguments. In turn, the domain controller 30 returns a search result to the W provider 13 (step S206).

Then, step S206 is followed by step S207 in which the W provider 13 outputs the search result received from the domain controller 30 to the union merge provider 12. It is noted that when the search result from the domain controller 30 corresponds to an error, for example, in a case where the attribute designated by the search attribute name does not correspond to information managed by the domain controller 30, the W provider may be arranged to output an empty value.

Then, step S207 is followed by step S208 in which the provider assigning unit 121 of the union merge provider 12 provides the user name, the domain name, and the search attribute name as arguments to call the search method (searchEntry) of the role provider 14. Then, step S208 is followed by step S209 in which the role DB search unit 142 of the role provider 14 accesses the role DB 141 to search for the attribute designated by the search attribute name (e.g., e-mail address) of the user designated by the user name and the domain name that are provided as arguments. Then, in step S210, the role provider 14 outputs the search result to the union merge provider 12.

Then, step S210 is followed by step S211 in which the union merge provider 12 merges the search result acquired from the W provider 13 and the search result acquired from the role provider 14. In a case where the search result corresponds to an e-mail address, merger of the search results may be realized by compiling the e-mail addresses obtained from the respective providers into a list, for example. In another example, a merge method may be pre-defined (e.g., setting a priority with respect to the search results), and one of the search results may be used according to the pre-defined method. It is noted that a pre-defined merge method may be registered in the merge structure information 123.

FIG. 15 is a table illustrating an exemplary configuration of the merge structure information including a merge method. In the merge structure information 123*a* as is illustrated in FIG. 15, part 124 corresponds to information defining the merge method. In the illustrated example, an indication is made for each attribute as to whether information acquired from the respective authentication providers is to be used by marking the corresponding entries with a circle ○ or a cross X. For example, it may be determined from the merge structure information 123a that in a case where the search attribute corresponds to group information, the group information from both the W provider 13 and the role provider 14 are used (i.e., information from the respective providers are merged). Also, in a case where the search attribute corresponds to an e-mail address, the information obtained from the role provider 14 is used.

It is noted that the above-described merge structure information 123a including a merge method may also be used in the process illustrated in FIG. 6. That is, in merging the tickets obtained from the respective authentication providers (step S113), the union merge provider 12 may refer to the merge structure information 123a to determine the information to be used out of the plural sets of information obtained from the respective authentication providers.

According to the present example, in step S212, the union merge provider 12 determines that the e-mail address obtained from the role provider 14 is to be used based on the merge structure information 123a, and outputs this e-mail address to the dispatcher 11 as a search result. Then, step S212 is followed by step S213 in which the dispatcher 11 sends a SOAP message including the search result as a SOAP response to the application 21.

As can be appreciated from the above descriptions, the application of the concept of merging authentication providers is not limited to use in a user authentication process. Rather, such a concept may be readily applied to processes for providing various other forms of information.

It is noted that according to the embodiments described above, information commonly used among plural applications and information dedicated to a predetermined application are provided as a merged ticket. However, the present invention is not limited to such embodiments, and for example, information commonly used among plural apparatuses and information dedicated to a predetermined apparatus may be provided as merged information.

It is noted that in recent years and continuing, examples are seen in which even a built-in apparatus with a dedicated function is provided a CPU so that it may function by means of software in a manner similar to the operation of a computer. The so-called multi-function printer, which corresponds to an imaging apparatus having multiple applications for realizing various functions such as printing, copying, and facsimile communication, is one exemplary type of such an apparatus. It is noted that the present invention may also be applied to such an apparatus.

Figure 16:
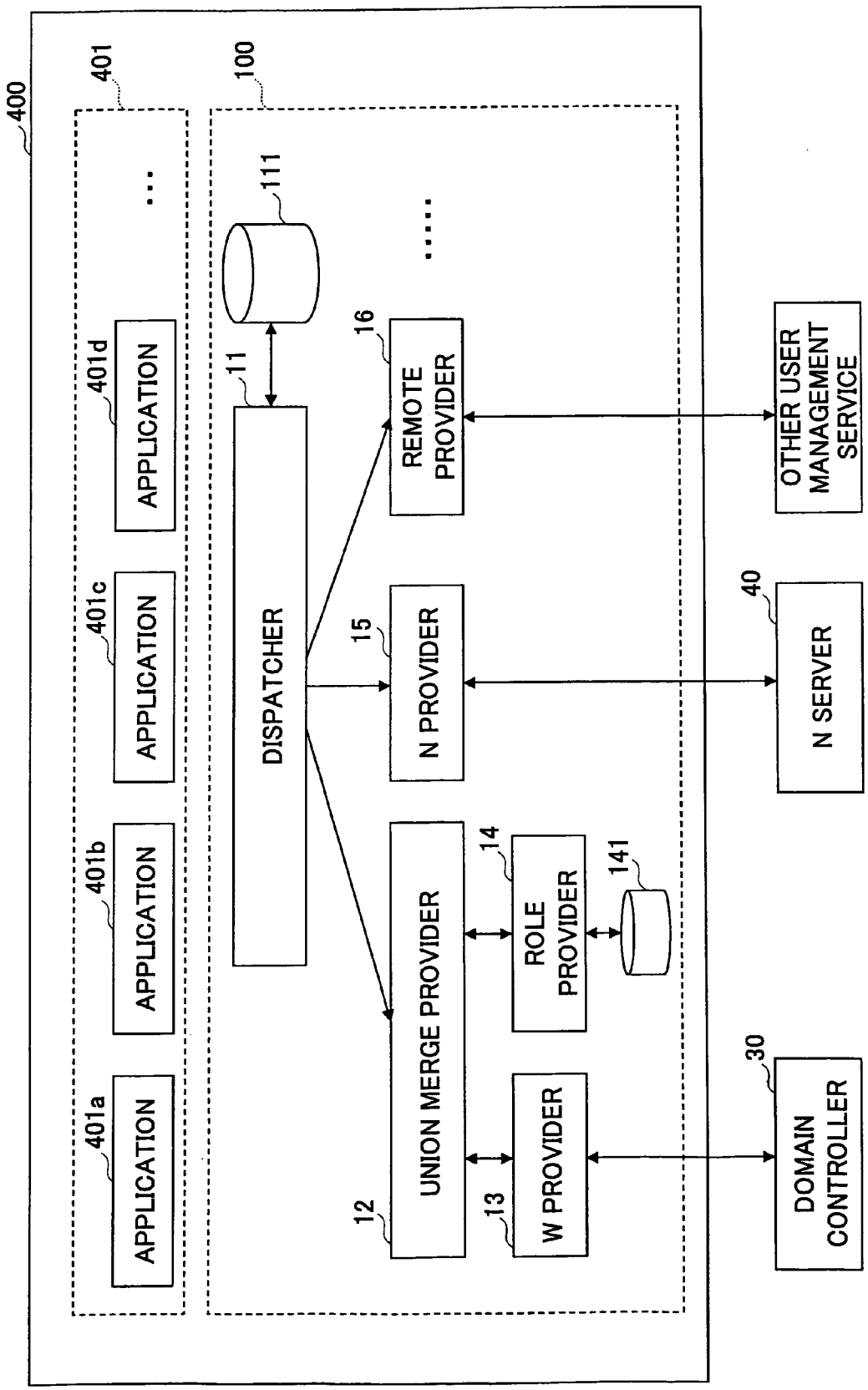
FIG. 16 is a block diagram showing a configuration of an apparatus implementing a user management service according to an embodiment of the present invention.

FIG. 16 is a block diagram showing a configuration of an apparatus implementing a user management service according to an embodiment of the present invention. It is noted that in the present drawing, elements that are identical to those shown in FIG. 3 are assigned the same numerical references, and their descriptions are omitted.

The apparatus 400 as is shown in FIG. 16 includes a user management service 100, and applications 401a, 401b, 401c, and 401d (collectively referred to as 'applications 401' hereinafter).

The applications 401 may be used to determine the functions that may be offered to a particular user based on user attribute information provided by the user management service 100. For example, in a case where the apparatus 400 corresponds to a multi-function printer, the applications 401 may correspond to a document management application for providing document management functions, a printing application for providing printing functions, and a distribution function for providing document distribution functions.

Further, it is noted that the present invention is not limited to the specific embodiments described, and variations and modifications may be made without departing from the scope of the present invention.

The present application is based on and claims the benefit of the earlier filing date of Japanese Patent Application No. 2004-027903 filed on Feb. 4, 2004, and Japanese Patent Application No. 2005-016833 filed on Jan. 25, 2005, the entire contents of which are hereby incorporated by reference.

What is claimed is:

1. An information providing apparatus, comprising:
an electronic memory;
a central processing unit to implement
a dispatcher unit to acquire a plurality of authentication information from at least two of a plurality of authentication providing units in response to a request from a predetermined application to which access is sought, the dispatcher unit storing the plurality of authentication information in the electronic memory and merging the plurality of authentication information into a merged authentication information, the plurality of authentication information including a common authentication information, shared by the plurality of applications, from a first authentication providing unit, and an application-specific authentication information, corresponding to the predetermined application, from a second authentication providing unit, and
a union merge unit to combine authentication information provided by at least two other authentication providing units of the plurality of authentication providing units before providing the authentication information to the dispatcher unit, the union merge unit determining a calling order of the at least two other authentication providing units based on a merge structure information; and
an interface unit to provide the merged authentication information to the predetermined application via a communication medium,
wherein the request from the predetermined application corresponds to a user authentication request, and the dispatcher unit sends another request to the first authentication providing unit to authenticate the user and acquires from the first authentication unit a verification information including information pertaining to the user and information verifying that the user has been authenticated, the union merge unit integrating the verification information from the first authentication providing unit and the application-specific authentication information from the second authentication providing unit as integrated verification information.

2. The information providing apparatus as claimed in claim 1 further comprising:
the first authentication providing unit and the second authentication providing unit.

3. The information providing apparatus as claimed in claim 1, wherein the application-specific authentication information includes authority information indicating a user authority with respect to a function of the predetermined application.

4. The information providing apparatus as claimed in claim 1, wherein the common authentication information acquired from the first authentication providing unit includes a group information pertaining to a group to which a user belongs within a predetermined system.

5. The information providing apparatus as claimed in claim 1, wherein an authentication providing unit identification information includes information for identifying the first authentication providing unit and the second authentication providing unit from the plurality of authentication providing units, and the dispatcher unit identifies the first authentication providing unit and the second authentication providing unit based on the authentication providing unit identification information.

6. The information providing apparatus as claimed in claim 1, wherein a usage determination information determining, with respect to an attribute included in the authentication information, whether to use the common authentication information and the application-specific information, and the union merge unit integrates the common authentication information and the application-specific information based on the usage determination information.

7. An information providing method that causes an information providing apparatus to merge a first authentication providing unit and a second authentication providing unit, the method comprising:
  acquiring a common authentication information pertaining to a user from the first authentication providing unit in response to a request from a predetermined application to which access is sought, the common authentication information from the first authentication providing unit being shared by the applications;
  acquiring an application-specific authentication information pertaining to the user from the second authentication providing unit, the application-specific information from the second authentication providing unit being dedicated to the predetermined application;
  storing the common authentication information and the application-specific authentication information in an electronic memory;
  integrating, in a data processor, the common authentication information and the application-specific authentication information into an integrated authentication information;
  determining, in the data processor, a calling order of the first and second authentication providing units in accordance with a merge structure information; and
  providing the integrated authentication information to the predetermined application;
  sending a request to the first authentication providing unit to authenticate the user;
  acquiring from the first authentication providing unit a verification information including the common authentication information pertaining to the user and information verifying that the user has been authenticated, when the request from the predetermined application corresponds to a user authentication request; and
  integrating the verification information from the first authentication providing unit and the application-specific authentication information from the second authentication providing unit as integrated verification information.

8. The information providing method as claimed in claim 7, wherein the application-specific authentication information includes authority information indicating an authority of the user with respect to a function of the predetermined application.

9. The information providing method as claimed in claim 7, wherein the common authentication information includes group information pertaining to a group to which the user belongs within a predetermined system.

10. The information providing method as claimed in claim 7, further comprising:
  identifying the first authentication providing unit and the second authentication providing unit based on an authentication providing unit identification information including information for identifying the first authentication providing unit and the second authentication providing unit, respectively, from a plurality of authentication providing units.

11. The information providing method as claimed in claim 7, further comprising:
  integrating the common authentication information and the application-specific information based on a usage determination information for determining, with respect to an attribute included in the user information, whether to use the common authentication information and the application-specific authentication information.

12. A computer-readable storage medium having computer readable instructions encoded thereon, the instructions when executed by a computer cause the computer to execute a method comprising:
  acquiring common authentication information pertaining to a user from a first authentication providing unit in response to a request from a predetermined application to which access is sought, the common authentication information from the first authentication providing unit being shared by the applications;
  acquiring application-specific authentication information pertaining to the user from a second authentication providing unit, the application-specific authentication information from the second authentication providing unit being dedicated to the predetermined application;
  integrating the common authentication information and the application-specific information into an integrated authentication information;
  determining a calling order of the first and second authentication providing units in accordance with a merge structure information; and
  providing the integrated authentication information to the predetermined application;
  sending a request to the first authentication providing unit to authenticate the user;
  acquiring from the first authentication providing unit a verification information including the common authentication information pertaining to the user and information verifying that the user has been authenticated, when the request from the predetermined application corresponds to a user authentication request; and
  integrating the verification information from the first authentication providing unit and the application-specific authentication information from the second authentication providing unit as integrated verification information.

* * * * *